(12) United States Patent
 Booth et al.

(10) Patent No.: US 12,065,239 B2
(45) Date of Patent: Aug. 20, 2024

(54) AIRCRAFT COMPRISING A FUSELAGE AND WINGS EACH HAVING AN OUTER PART AND A WIDENED INNER PART BETWEEN THE FUSELAGE AND THE OUTER PART

(71) Applicants: Airbus SAS, Blagnac (FR); Airbus Operations SAS, Toulouse (FR)

(72) Inventors: Andrew Booth, Blagnac (FR); Julien Laverne, Toulouse (FR); Alistair Forbes, Toulouse (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/940,073

(22) Filed: Sep. 8, 2022

(65) Prior Publication Data
US 2023/0077740 A1 Mar. 16, 2023

(30) Foreign Application Priority Data
Sep. 16, 2021 (FR) ....................................... 2109742

(51) Int. Cl.
*B64C 3/10* (2006.01)
*B64D 37/04* (2006.01)

(52) U.S. Cl.
CPC ................ *B64C 3/10* (2013.01); *B64D 37/04* (2013.01)

(58) Field of Classification Search
CPC ..... B64C 3/10; B64C 39/10; B64C 2039/105; B64D 37/04
See application file for complete search history.

(56) References Cited

U.S. PATENT DOCUMENTS

| 1,862,102 | A | 6/1932 | Stout | |
| 11,697,507 | B1 * | 7/2023 | Kawai | F17C 1/12 244/135 R |
| 2002/0145075 | A1 * | 10/2002 | Page | B64C 39/10 244/36 |
| 2004/0195454 | A1 | 10/2004 | Page et al. | |
| 2008/0230654 | A1 * | 9/2008 | Velicki | B64D 37/04 244/135 R |
| 2010/0187352 | A1 * | 7/2010 | Yavilevich | B64D 37/04 244/45 R |
| 2014/0175215 | A1 | 6/2014 | Gallant et al. | |

(Continued)

FOREIGN PATENT DOCUMENTS

| EP | 1247734 | A2 | 10/2002 |
| FR | 3000023 | A1 | 6/2014 |
| RU | 2668000 | C1 | 9/2018 |

OTHER PUBLICATIONS

French Search Report; priority document.

*Primary Examiner* — Brady W Frazier
*Assistant Examiner* — Shanna Danielle Glover
(74) *Attorney, Agent, or Firm* — Greer, Burns & Crain, Ltd.

(57) ABSTRACT

An aircraft comprising a fuselage, first and second wings positioned on either side of the fuselage, wherein each wing includes an inner part connected to the fuselage and an outer part continuing the inner part, the end of each inner part connected to the fuselage having a height greater than half the height of the fuselage and extending over a length greater than or equal to half of a distance separating the nose and the tail of the fuselage.

9 Claims, 5 Drawing Sheets

(56) References Cited

U.S. PATENT DOCUMENTS

| | | | |
|---|---|---|---|
| 2016/0009402 A1* | 1/2016 | Hunter | B64C 39/02 244/53 R |
| 2022/0388628 A1* | 12/2022 | Regnier | B64D 37/04 |
| 2023/0348101 A1* | 11/2023 | Kawai | B64F 1/28 |

* cited by examiner

AIRCRAFT COMPRISING A FUSELAGE AND WINGS EACH HAVING AN OUTER PART AND A WIDENED INNER PART BETWEEN THE FUSELAGE AND THE OUTER PART

CROSS-REFERENCES TO RELATED APPLICATIONS

This application claims the benefit of the French patent application No. 2109742 filed on Sep. 16, 2021, the entire disclosures of which are incorporated herein by way of reference.

FIELD OF THE INVENTION

The present application relates to an aircraft comprising a fuselage and wings each having an outer part and a widened inner part between the fuselage and the outer part.

BACKGROUND OF THE INVENTION

According to a first embodiment shown in FIG. 1, an aircraft 10 comprises a fuselage 12, wings 14 arranged on either side of the fuselage 12, and propulsion assemblies 16 connected to the wings 14. The fuselage 12 comprises a nose 18.1 in which a cockpit is positioned, a tail 18.2 supporting an empennage 20, and multiple approximately cylindrical portions 22 positioned between the nose and the tail 18.1, 18.2. One of the portions 22 has a central wing box making it possible to connect the wings 14 to the fuselage 12. The wings 14 are connected to the same single portion 22.1 of the fuselage and only to the lower part of this portion 22.1. Each wing 14 has a box shape and comprises at least one fuel tank 24, which extends over virtually the entire length of the wing 14.

This first embodiment makes it possible to use perfectly controlled assembly techniques. In addition, the cylindrical shape of the fuselage 12 is suitable for existing airport infrastructures.

In this first embodiment, each wing 14 exhibits a sweep which gives rise to non-negligible effects on the position of the center of gravity CG of the aircraft 10 and on its stability when the level of fuel varies in the fuel tanks 24 located in the wings during operation.

In a second embodiment, the aircraft has a sailwing profile. This second embodiment makes it possible to be able to position the tanks close to the center of gravity. However, this sailwing profile is not suitable for existing airport infrastructures and requires complete modification of the existing assembly lines.

The present invention seeks to remedy all or some of the drawbacks of the prior art.

SUMMARY OF THE INVENTION

To that end, the invention relates to an aircraft comprising a fuselage, first and second wings positioned on either side of the fuselage, the fuselage having a longitudinal axis and a fuselage height, the fuselage comprising a nose, a tail and at least one portion positioned between the nose and the tail.

According to the invention, each wing comprises an inner part and an outer part such that each inner part connects the corresponding outer part and the fuselage, each inner part comprising a first end connected by a first connection to the corresponding outer part and a second end connected by a second connection to the fuselage; each inner part having, at the second end, a height greater than half the height of the fuselage, the second end of each inner part extending over a length greater than or equal to half of a distance separating the nose and the tail.

This solution makes it possible to be able to position the energy storage devices of the aircraft, in particular the fuel tanks, close to the center of gravity in the inner parts by virtue of their height whilst still retaining numerous components of the fuselage of existing aircraft (the nose and the tail, the portions without a central wing box) and assembling them by implementing assembly processes known from the prior art.

According to another feature, each fuselage portion has a fuselage structure and an aerodynamic fuselage envelope fitted on the fuselage structure, each outer part having a wing outer part structure and an aerodynamic wing outer part envelope fitted on the wing outer part structure. In addition, each inner part comprises at least one wing inner part structure ensuring the transmission of forces between the wing outer part structure of the corresponding outer part and the fuselage structure, and an aerodynamic wing inner part envelope ensuring that the aerodynamic wing outer part envelope of the corresponding outer part and the aerodynamic envelope of the fuselage are continuous.

According to another feature, for each inner part, the first end has a first length, the second end having a second length at least twice the first length of the first end, the first and second ends being separated by a distance less than the second length.

According to another feature, the aircraft has energy storage devices, at least one of the energy storage devices being positioned inside each of the inner parts.

According to another feature, at least part of the wing inner part structures of the inner parts forms a single piece passing through the fuselage and extending on either side of the fuselage.

According to another feature, the wing inner part structure of each inner part comprises a panel, positioned in a plane parallel to the longitudinal axis and horizontal or slightly inclined with respect to a horizontal plane, which extends between the first and second ends of each inner part.

According to another feature, the wing inner part structure of each inner part comprises multiple spars positioned in vertical planes, at least two spars being separated by a distance which increases from the first end toward the second end.

According to another feature, for each wing, the first connection comprises a first plate integral with the wing outer part structure and positioned at the first end of the outer part, a second plate integral with the wing inner part structure and positioned at the first end of the inner part, and multiple connection elements keeping the first and second plates pressed against one another.

According to another feature, each inner part comprises at least one cylindrical fuel tank positioned along the fuselage and having an axis of revolution parallel to the longitudinal axis.

According to another feature, each fuel tank has a volume of greater than 5 m$^3$.

According to another feature, the energy storage devices are supported by the wing inner part structures of the inner parts and positioned such that they are not affected in the event of lateral or rearward tilting of the aircraft or in the event of a landing on the fuselage.

According to another feature, at least one of the inner parts comprises at least one cooling device having at least one heat exchanger positioned inside the aerodynamic wing inner part envelope, at least one upstream duct connected to the heat exchanger and opening out via at least one forward-facing first opening positioned outside of the aerodynamic wing inner part envelope and below the inner part, and at least one downstream duct connected to the heat exchanger and opening out via at least one rearward-facing second opening positioned outside of the aerodynamic wing inner part envelope and above the inner part.

BRIEF DESCRIPTION OF THE DRAWINGS

Other features and advantages will become apparent from the following description of the invention, which description is given solely by way of example, with reference to the appended drawings in which.

DETAILED DESCRIPTION OF THE PREFERRED EMBODIMENTS

Figure 1:
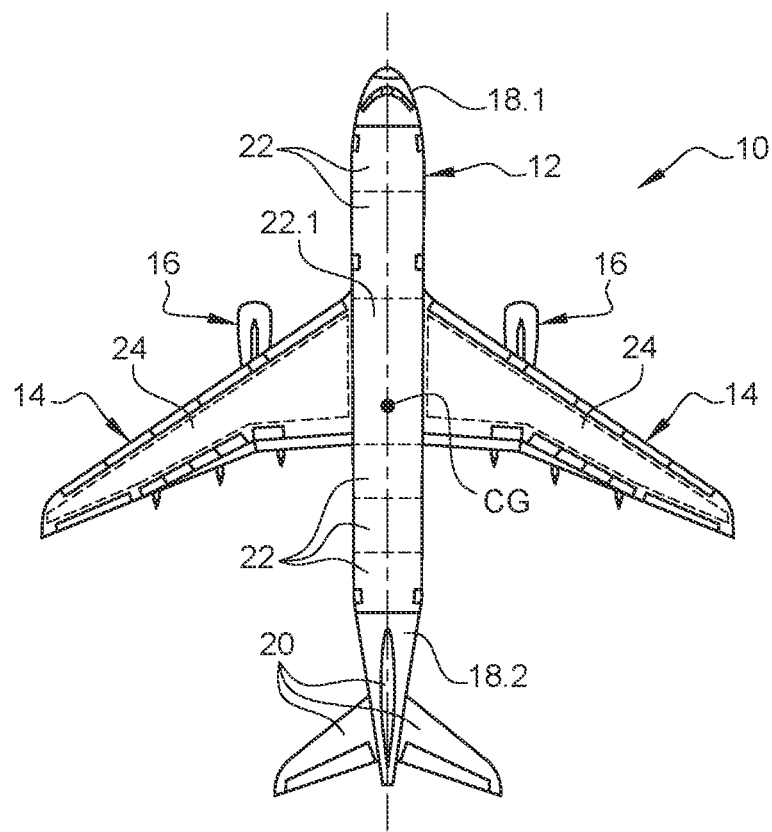
FIG. 1 is a top view of an aircraft, illustrating an embodiment of the prior art.
Figure 2:
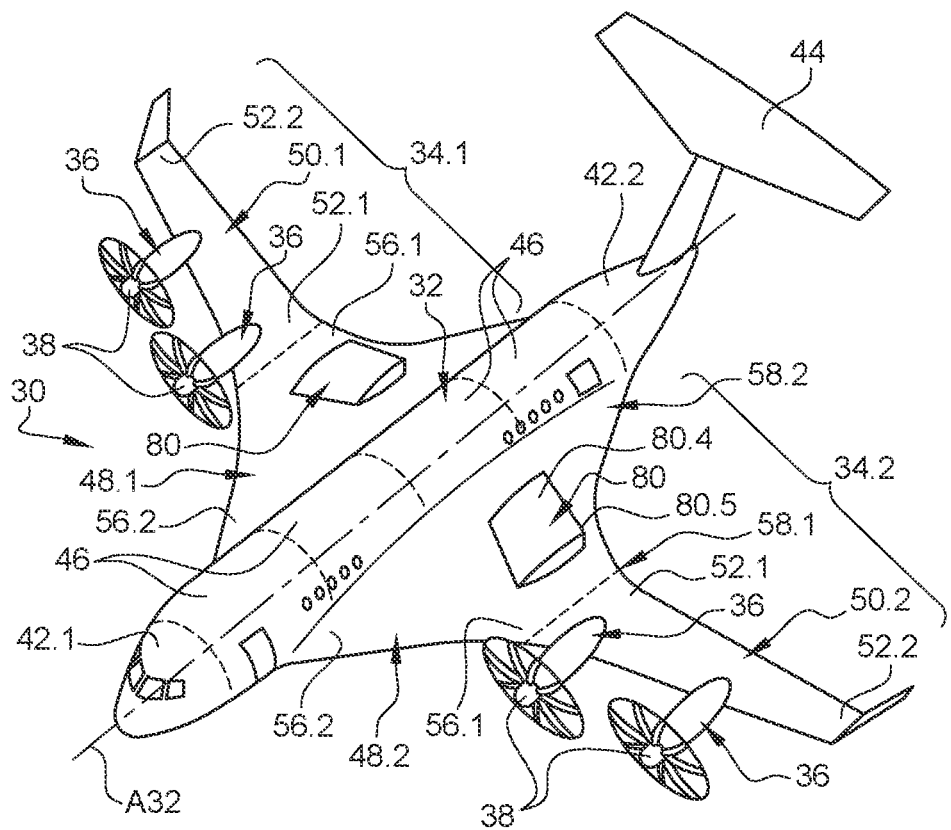
FIG. 2 is a perspective view of an aircraft, illustrating an embodiment of the invention.
Figure 3:
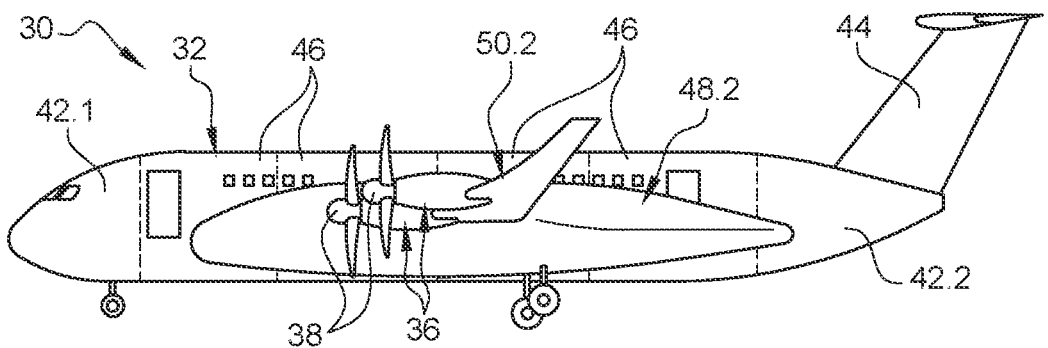
FIG. 3 is a side view of the aircraft shown in FIG. 2.
Figure 4:
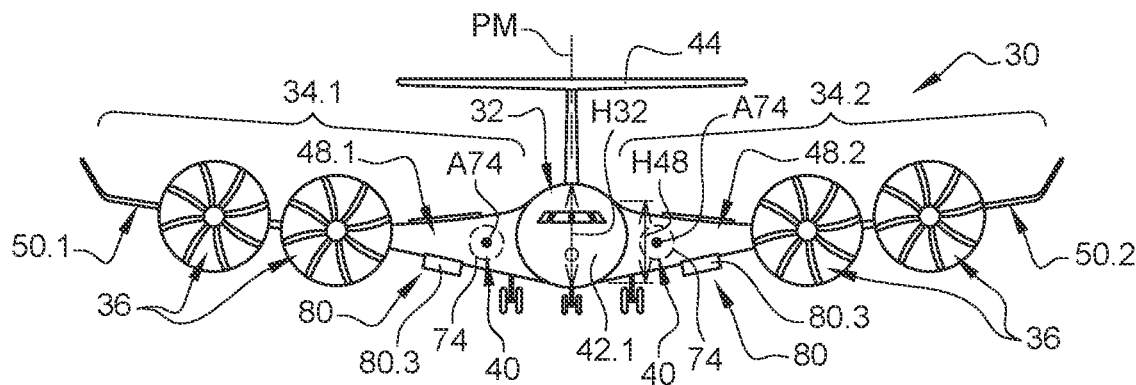
FIG. 4 is a front view of the aircraft shown in FIG. 2.

According to an embodiment shown in FIGS. 2 to 5 and 7, an aircraft 30 comprises a fuselage 32, first and second wings 34.1, 34.2 positioned on either side of the fuselage 32, and propulsion assemblies 36 connected to the fuselage 32 or to the first and second wings 34.1, 34.2. In a configuration shown in FIGS. 1 to 5, the aircraft 30 comprises four propulsion assemblies 36 connected to the first and second wings 34.1, 34.2. In another configuration shown in FIG. 11, the aircraft 30 comprises two propulsion assemblies 36 connected to the fuselage 32.

In one embodiment, each propulsion assembly 36 comprises an electric or hydrogen-powered propeller engine 38.

Of course, the invention is not restricted to these configurations as concerns the number of propulsion assemblies 36, their location or the drive type.

Irrespective of the embodiment, the aircraft 30 comprises multiple energy storage devices 40, such as aviation fuel tanks, hydrogen tanks or batteries, for example. One and the same aircraft may provide different types of energy storage devices 40, such as hydrogen tanks and batteries, for example.

Figure 5:
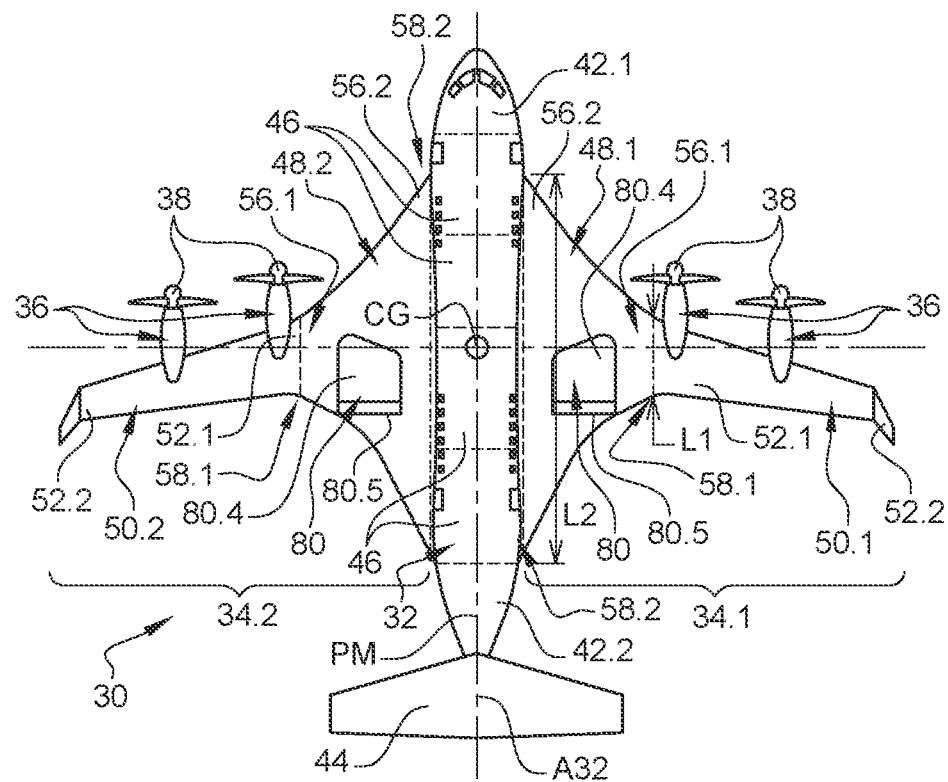
FIG. 5 is a top view of the aircraft shown in FIG. 2.

In an embodiment shown in FIG. 5, the fuselage 32 comprises a nose 42.1 in which a cockpit is positioned, a tail 42.2 supporting an empennage 44, and at least one approximately cylindrical portion 46 positioned between the nose and the tail 42.1, 42.2. The fuselage 32 comprises a longitudinal axis A32 which extends between the nose and the tail 42.1, 42.2, each portion 46 being substantially coaxial with the longitudinal axis A32.

For the remainder of the description, a longitudinal direction is parallel to the longitudinal axis A32. A transverse plane is a plane perpendicular to the longitudinal axis. A median plane PM corresponds to a vertical plane passing through the longitudinal axis A32. A length corresponds to a dimension taken in a direction parallel to the longitudinal direction. A height corresponds to a dimension taken in a vertical direction.

In general, the fuselage 32 comprises multiple portions 46 which correspond to sub-assemblies of the fuselage 32 that are manufactured independently of one another, disposed end to end and assembled to form the fuselage 32.

In one embodiment, each portion 46 comprises a fuselage structure and an aerodynamic fuselage envelope fitted on the fuselage structure. The latter comprises frames arranged in transverse planes and stringers which connect the frames and are parallel to the longitudinal direction.

The fuselage 32 is made using assembly methods known from the prior art.

In one configuration, the empennage 44 is a T-shaped empennage and comprises a tail fin positioned in the median plane PM and horizontal stabilization surfaces positioned at the upper end of the tail fin. Of course, the invention is not restricted to this configuration for the empennage 44.

In one embodiment, each wing 34.1, 34.2 comprises an inner part 48.1, 48.2 connected to the fuselage 32 and an outer part 50.1, 50.2 continuing the inner part 48.1, 48.2. Thus, for each wing 34.1, 34.2, the inner part 48.1, 48.2 connects the corresponding outer part 50.1, 50.2 and the fuselage 32.

Each outer part 50.1, 50.2 has a first end 52.1 facing the fuselage 32 and a second end 52.2.

Figure 7:
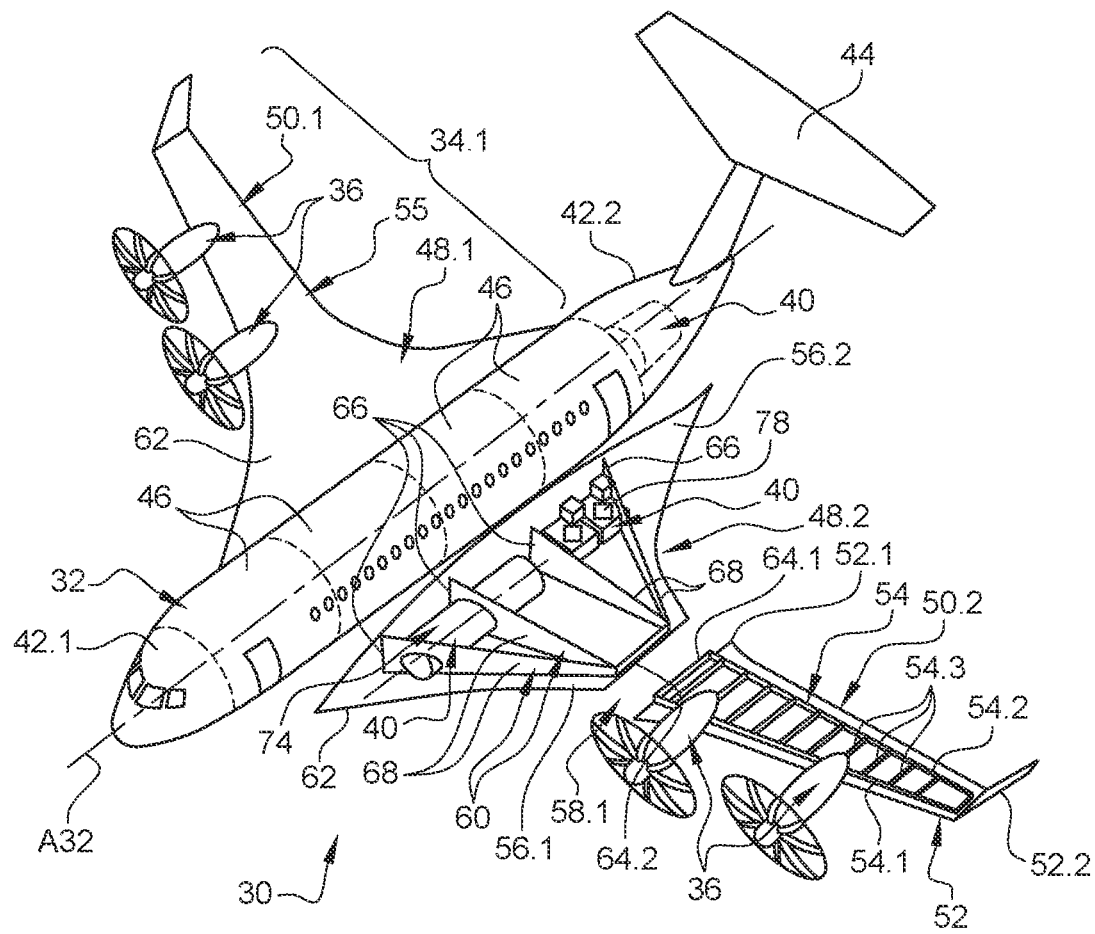
FIG. 7 is a perspective view of the aircraft shown in FIG. 2, half of the aircraft being illustrated prior to assembly, the elements located in this aircraft half being shown by transparency.

In an embodiment shown in FIG. 7, each outer part 50.1, 50.2 comprises a wing outer part structure 54 and an aerodynamic wing outer part envelope 55 fitted on the wing outer part structure 54. In one configuration, the wing outer part structure 54 of each outer part 50.1, 50.2 comprises front and rear spars 54.1, 54.2, which extend over virtually the entire length of each outer part 50.1, 50.2, and ribs 54.3 connecting the front and rear spars 54.1, 54.2.

The outer parts 50.1, 50.2 are made using assembly methods known from the prior art.

Just as for the prior art, the first end 52.1 of the outer parts 50.1, 50.2 has a length substantially equal to that of a wing of the prior art.

In one embodiment, the outer parts 50.1, 50.2 do not incorporate fuel tanks. In this case, the outer parts 50.1, 50.2 have a height less than the wings of the aircraft of the prior art. This embodiment makes it possible to simplify the manufacture of the outer parts 50.1, 50.2 and to reduce the costs thereof. However, to increase the range of action of the aircraft, the outer parts 50.1, 50.2 may each comprise at least one fuel tank, just as for the prior art.

Of course, the invention is not restricted to this embodiment for the outer parts 50.1, 50.2.

According to one feature of the invention, each inner part 48.1, 48.2 comprises a first end 56.1 connected by a first connection 58.1 to the corresponding outer part 50.1, 50.2 and a second end 56.2 connected by a second connection 58.2 to the fuselage 32. The second end 56.2 has a second length L2 at least twice the first length L1 of the first end

56.1. The distance separating the first and second ends 56.1, 56.2 is less than the second length L2 of the second end 56.2. At the second end 56.2, the inner parts 48.1, 48.2 have a height H48 greater than half the height H32 of the fuselage.

The first and second ends 56.1, 56.2 are separated by a distance less than the second length L2.

In one arrangement, the second end 56.2 extends over a length greater than or equal to half the distance separating the nose and the tail 42.1, 42.2. Thus, each inner part 48.1, 48.2 is connected to the fuselage structure of multiple portions 46 over a considerable length, thereby allowing a better distribution of forces.

Each inner part 48.1, 48.2 comprises at least one wing inner part structure 60 ensuring the transmission of forces between the wing outer part structure 54 of the outer part 50.1, 50.2 and the fuselage structure of the fuselage 32, and an aerodynamic wing inner part envelope 62 ensuring that the aerodynamic wing outer part envelope 55 of the outer part 50.1, 50.2 and the aerodynamic envelope of the fuselage 32 are continuous.

In one embodiment, the second connection 58.2 comprises multiple anchoring points 66 distributed over the length of the fuselage 32 and positioned at the fuselage structure of each portion 46, more particularly at the frames of the fuselage structure.

In a configuration shown in FIG. 7, the first connection 58.1 comprises a first plate 64.1 integral with the wing outer part structure 54, positioned at the first end 52.1 of the outer part 50.1, 50.2, in a plane approximately vertical and parallel to the longitudinal direction, a second plate 64.2 integral with the wing inner part structure 60 and positioned at the first end 56.1 of the inner part 48.1, 48.2, in a plane approximately vertical and parallel to the longitudinal direction, and multiple connection elements, such as bolts for example, keeping the first and second plates 64.1, 64.2 pressed against one another.

Of course, the invention is not restricted to this embodiment for the first connection 58.1. Other solutions are conceivable.

In a first embodiment shown in FIG. 7, the wing inner part structure 60 comprises multiple spars 68 positioned in vertical planes extending between the first and second ends 56.1, 56.2 of each inner part 48.1, 48.2, at least two spars 68 being separated by a distance which increases from the first end 56.1 toward the second end 56.2. In one configuration, the spars 68 have a first end connected to the second plate 64.2 and a second end connected by connection elements, such as bolts for example, to the fuselage structure and more particularly to the frames of the fuselage 32.

Figure 10:
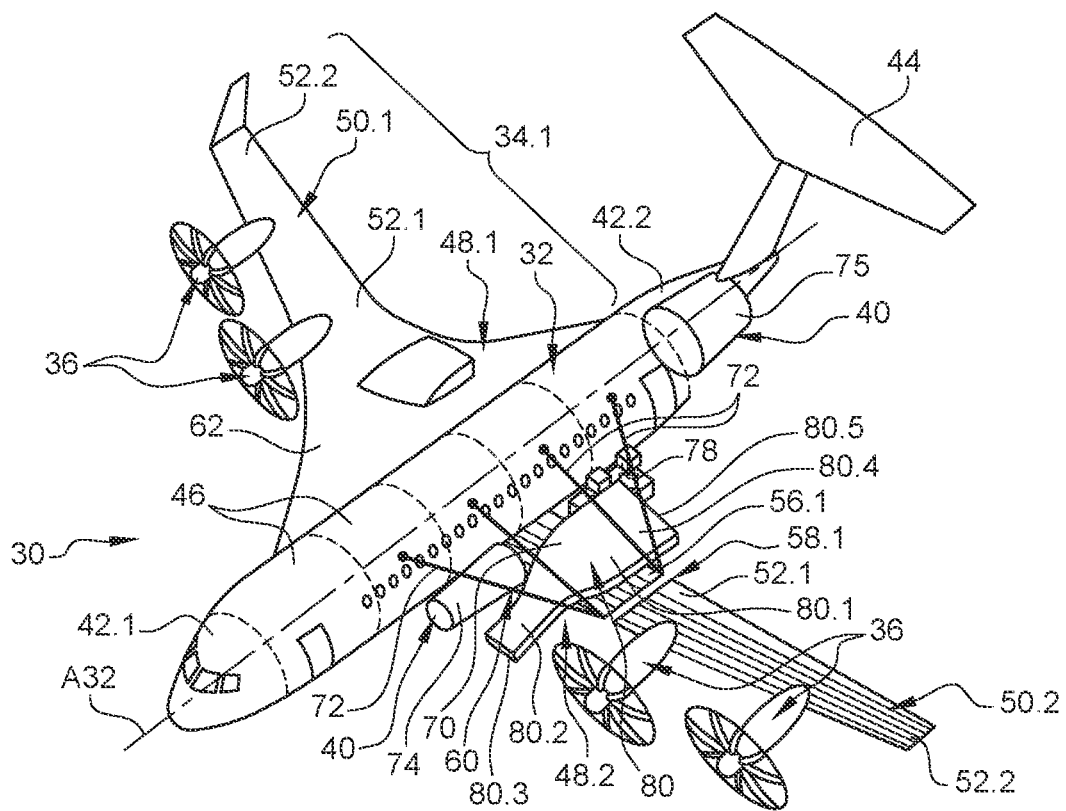
FIG. 10 is a perspective view of an aircraft, illustrating an embodiment of the invention, the envelopes of one wing and of half of the fuselage being transparent.
Figure 11:
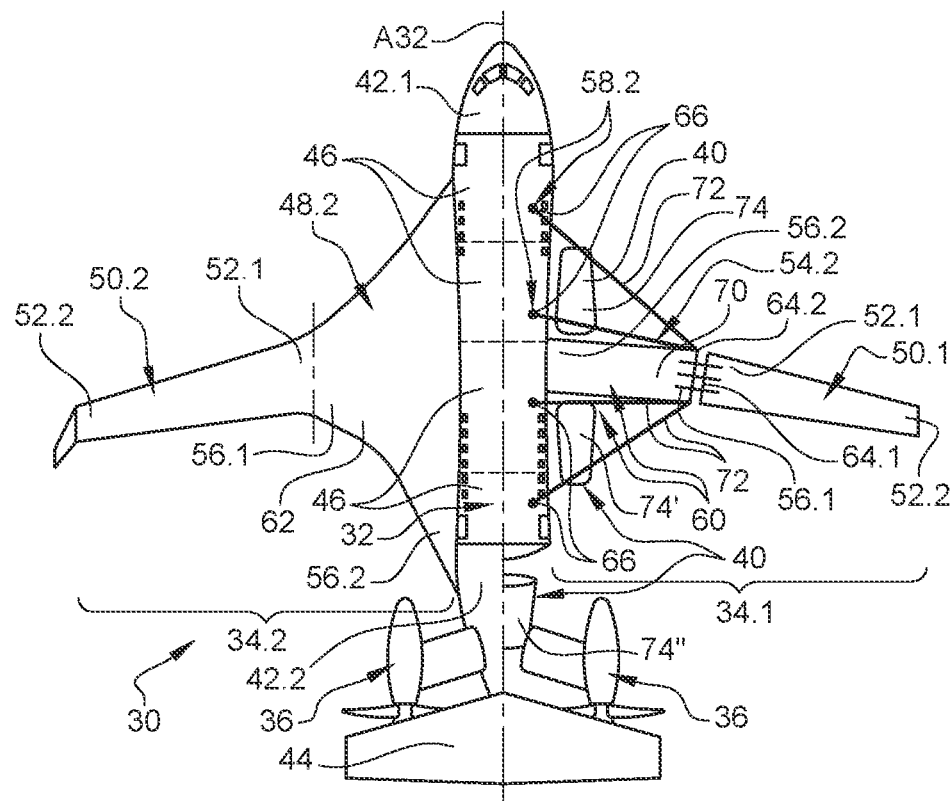
FIG. 11 is a top view of an aircraft, illustrating an embodiment of the invention, the envelopes of one wing and of half of the fuselage being transparent.

In a second embodiment shown in FIGS. 10 and 11, the wing inner part structure 60 comprises a panel 70, positioned in a plane parallel to the longitudinal axis A32 and horizontal or slightly inclined with respect to a horizontal plane which extends between the first and second ends 56.1, 56.2 of each inner part 48.1, 48.2. In one configuration, the panel 70 is reinforced by a network of ribs. In addition, the wing inner part structure 60 may comprise connecting rods 72 having a first end connected to the panel 70 at the first end 56.1 of the inner part 48.1, 48.2 and a second end connected to the fuselage structure, for example to one of the frames, at an anchoring point 66 remote from the panel 70.

In one configuration, the panels 70 of the inner parts 48.1, 48.2 form the same single piece which passes through, and extends on either side of, the fuselage 32.

Thus, for some embodiments, a structure may pass through, and extend on either side of, the fuselage 32 in order to at least partially form the wing inner part structure 60 of the inner parts 48.1, 48.2.

In one configuration, the second connection 58.2 is configured to prioritize breaking in the event of an accident in order to detach the inner parts 48.1, 48.2 from the fuselage 32 to reinforce the safety of the passengers.

Of course, the invention is not restricted to these embodiments for the wing inner part structures 60 and for the first and second connections 58.1, 58.2 of the inner parts 48.1, 48.2.

Each aerodynamic wing inner part envelope 62 has a height at the fuselage 32 considerably greater than its height at the outer part 50.1, 50.2. In this way, the aerodynamic wing inner part envelopes 62 of the inner parts 48.1, 48.2 provide two large volumes on either side of and close to the fuselage 32, in which it is possible to store elements or items of equipment of the aircraft 30.

In one embodiment, each inner part 48.1, 48.2 comprises at least one energy storage device 40 positioned in the aerodynamic wing inner part envelope 62.

In one configuration, the energy storage device 40 comprises at least one element from among: at least one fuel tank 74, at least one battery 76, and at least one fuel cell 78.

Figure 6:
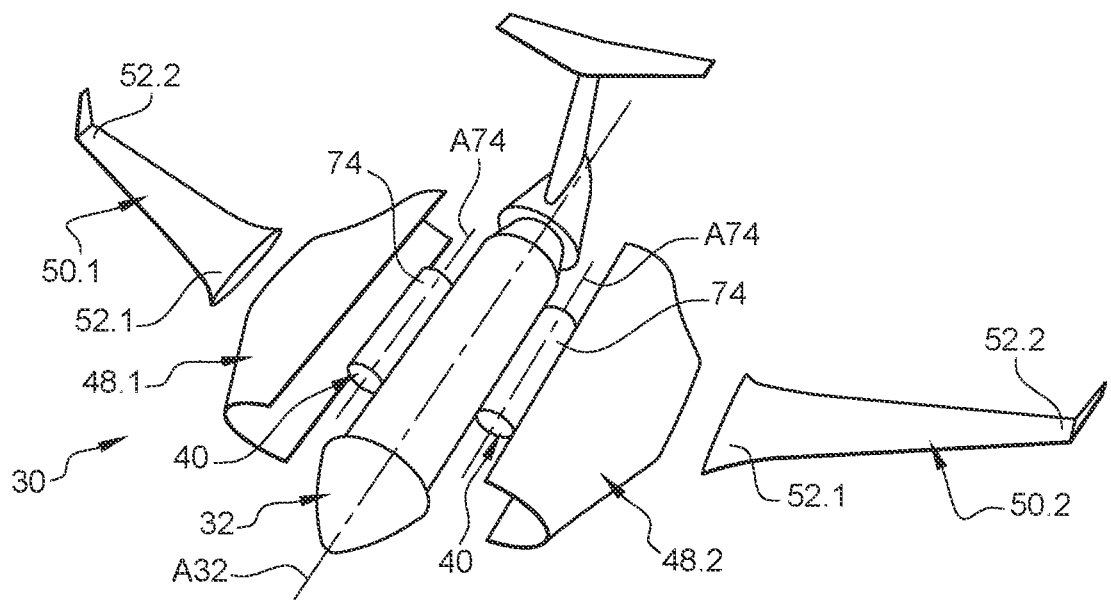
FIG. 6 is a schematic depiction of the various parts of an aircraft, illustrating an embodiment of the invention.

In a configuration shown in FIG. 6, each inner part 48.1, 48.2 comprises a fuel tank 74 configured to store hydrogen. This fuel tank 74 is cylindrical, is positioned along the fuselage 32 (adjoining it) and has an axis of revolution A74 parallel to the longitudinal axis A32. Of course, the invention is not restricted to this geometry for the fuel tanks 74.

Figure 9:
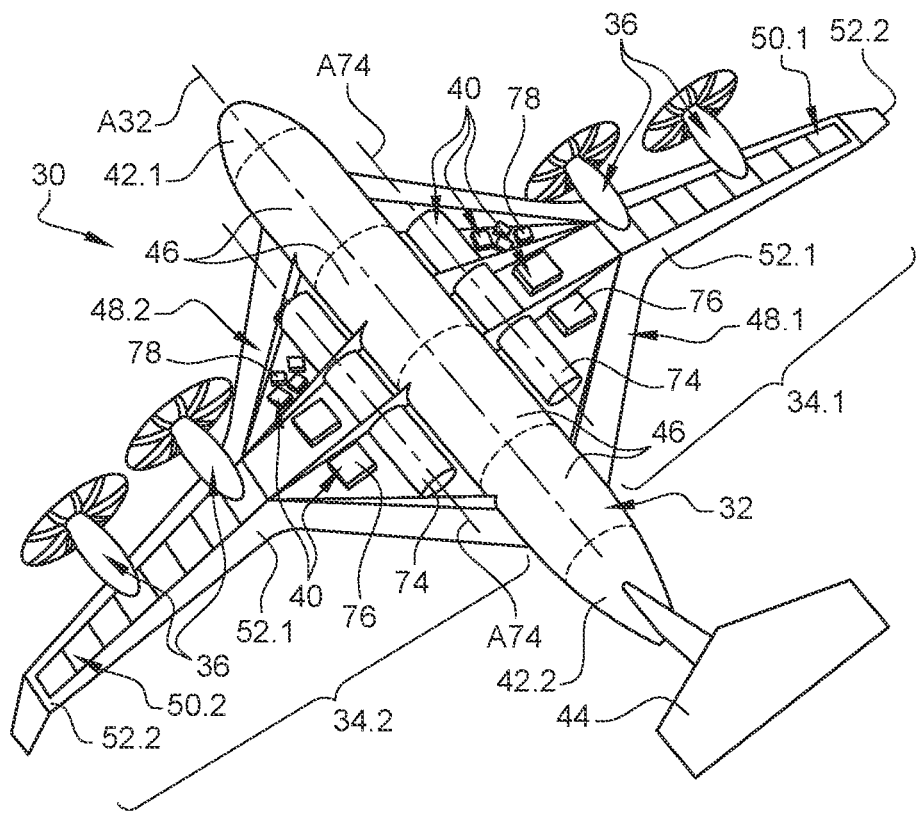
FIG. 9 is a perspective view of an aircraft, showing by transparency an arrangement of the items of equipment of the aircraft, which illustrates an embodiment of the invention.

In another configuration shown in FIGS. 7 and 9, each inner part 48.1, 48.2 comprises a fuel tank 74 positioned along the fuselage 32 and fuel cells 78 positioned along the fuselage 32 and offset toward the rear with respect to the fuel tank 74. As above, the fuel tank 74 is cylindrical, is configured to store hydrogen, and is positioned such that its axis of revolution A74 is parallel to the longitudinal axis A32.

In another configuration shown in FIG. 9, each inner part 48.1, 48.2 comprises a fuel tank 74 positioned along the fuselage 32 and fuel cells 78 at a distance from the fuselage 32, the fuel tank 74 being positioned between the fuselage 32 and the fuel cells 78.

In another configuration shown in FIG. 11, each inner part 48.1, 48.2 comprises multiple cylindrical fuel tanks 74, 74' configured to store hydrogen and positioned one behind another along the fuselage 32 such that their axes of revolution A74 are parallel to the longitudinal axis A32. By way of example, the fuel tanks 74, 74' have a volume greater than or equal to 5 m$^3$.

Irrespective of the configuration, the energy storage devices 40 are positioned close to the fuselage 32 in the inner parts 48.1, 48.2 of the wings 34.1, 34.2 which have a weak sweep, this tending to limit the effect on the position of the center of gravity CG of the aircraft and on its stability, in particular when the level of fuel in the fuel tanks 74, 74' varies during operation.

In one arrangement, the energy storage devices 40 are supported by the wing inner part structures 60 of the inner parts 48.1, 48.2 and positioned such that they are not affected in the event of lateral or rearward tilting of the aircraft, in the event of landing on the fuselage 32, or in the event of rupture of a rim or a tire of a landing gear.

Of course, the invention is not restricted to these configurations for the energy storage devices 40. Thus, to increase the amount of fuel on board, it is possible to provide a fuel tank 74' in the fuselage 32, for example in the tail 42.2.

In an embodiment, at least one of the inner parts 48.1, 48.2 comprises at least one cooling device 80 configured to cool an item of equipment, such as the fuel cells 78. In one configuration, the cooling device 80 comprises at least one heat exchanger 80.1 positioned inside the aerodynamic wing inner part envelope 62, at least one upstream duct 80.2 connected to the heat exchanger 80.1 and opening out via at least one forward-facing first opening 80.3 positioned outside of the aerodynamic wing inner part envelope 62 and below the inner part 48.1, 48.2, and at least one downstream duct 80.4 connected to the heat exchanger 80.1 and opening out via at least one rearward-facing second opening 80.5 positioned outside of the aerodynamic wing inner part envelope 62 and above the inner part 48.1, 48.2.

According to an advantage obtained by the invention, the first and second inner parts 48.1, 48.2 provide two large volumes in which numerous items of equipment can be gathered together. This configuration simplifies the installation and maintenance of these items of equipment because they are gathered together and not spread out in the aircraft. Because the items of equipment are gathered together, it is also possible to reduce the mass on board by restricting the length of the connections between the various items of equipment.

According to another advantage, it is possible to use numerous components of the fuselage of existing aircraft, such as the nose and the tail, the portions without a central wing box for example, and to assemble them using assembly methods known from the prior art. Thus, the assembly lines for existing aircraft can be largely reused.

Because the wing is connected to multiple portions, it is possible to distribute the ability to react forces and to not concentrate it over a single portion.

According to another advantage, the outer parts 50.1, 50.2 of the wings 34.1, 34.2 are simplified inasmuch as they do not incorporate fuel tanks. They may equally be joined to inner parts 48.1, 48.2 before or after the latter are fixed to the fuselage 32.

Figure 8:
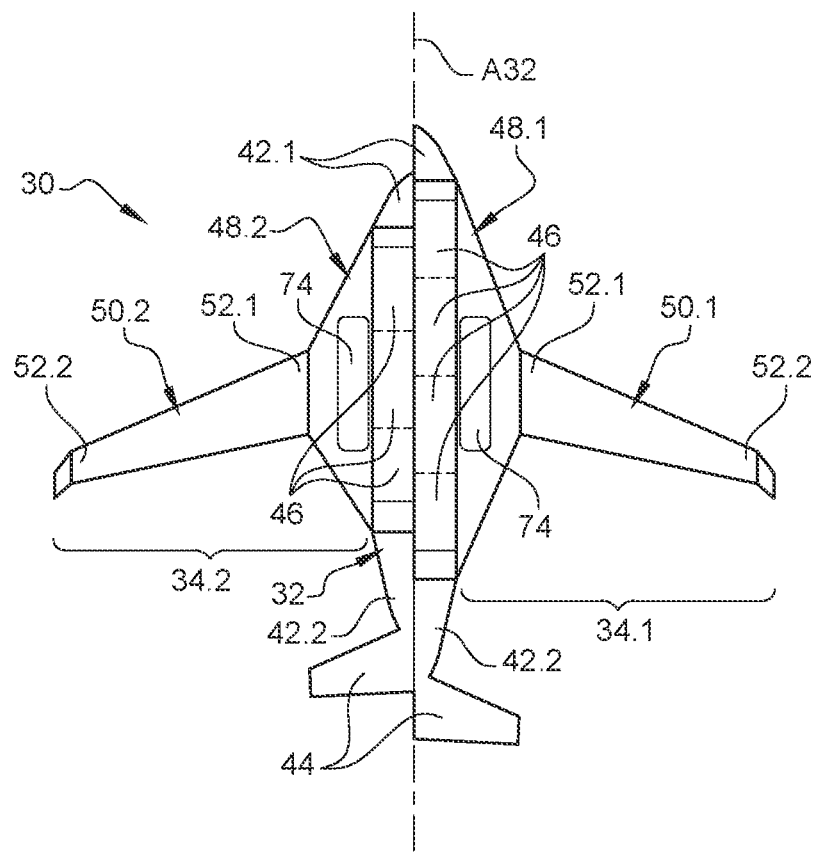
FIG. 8 is a schematic depiction of a first aircraft half configured for a first passenger capacity and a second aircraft half configured for a second capacity.

Lastly, it is possible to design, on the same basis, aircraft with different passenger capacities, as illustrated in FIG. 8. Thus, apart from the number of portions and inner parts 48.1, 48.2, all the other elements of the aircraft are identical and may be assembled in the same way irrespective of the capacity of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage,
   first and second wings positioned on either side of the fuselage,
   the fuselage having a longitudinal axis and a fuselage height, the fuselage comprising:
   a nose,
   a tail, and
   at least one portion positioned between the nose and the tail, such that each wing comprises:
   an inner part, and
   an outer part such that each inner part connects the corresponding outer part and the fuselage, each inner part comprising:
   a first end connected by a first connection to the corresponding outer part, and
   a second end connected by a second connection to the fuselage,
   each inner part having, at the second end, a height greater than half the height of the fuselage, the second end of each inner part extending over a length greater than or equal to half of a distance separating the nose and the tail;
   wherein each inner part comprises at least one cylindrical fuel tank positioned along the fuselage and having an axis of revolution parallel to the longitudinal axis,
   wherein each inner part comprises multiple spars positioned in vertical planes, at least two spars being separated by a distance which increases from the first end toward the second end,
   wherein each fuel tank passes through at least one of the at least two spars.

2. The aircraft as claimed in claim 1,
   wherein each fuselage portion has a fuselage structure and an aerodynamic fuselage envelope fitted on the fuselage structure,
   wherein each outer part has a wing outer part structure and an aerodynamic wing outer part envelope fitted on the wing outer part structure, and
   wherein each inner part comprises at least one wing inner part structure ensuring a transmission of forces between the wing outer part structure of the corresponding outer part and the fuselage structure, and an aerodynamic wing inner part envelope ensuring that the aerodynamic wing outer part envelope of the corresponding outer part and the aerodynamic fuselage envelope are continuous.

3. The aircraft as claimed in claim 1,
   wherein, for each inner part, the first end has a first length, and
   wherein the second end has a second length at least twice the first length of the first end, the first and second ends being separated by a distance less than the second length.

4. The aircraft as claimed in claim 1, wherein the at least one cylindrical fuel tank comprises a plurality of cylindrical fuel tanks being positioned inside each of the inner parts.

5. The aircraft as claimed in claim 2, wherein the at least one wing inner part structure of each inner part comprises a panel, positioned in a plane parallel to the longitudinal axis and horizontal or slightly inclined with respect to a horizontal plane, which extends between the first and second ends of each inner part.

6. The aircraft as claimed in claim 1, wherein, for each wing, the first connection comprises a first plate integral with the outer part and positioned at the first end of the outer part, a second plate integral with the inner part and positioned at the first end of the inner part, and multiple connection elements keeping the first and second plates pressed against one another.

7. The aircraft as claimed in claim 4, wherein each cylindrical fuel tank of the plurality of cylindrical fuel tanks has a volume of greater than 5 m$^3$.

8. The aircraft as claimed in claim 4, wherein each cylindrical fuel tank is supported by the inner part of each wing and positioned such that they are not affected upon a lateral or rearward tilting of the aircraft or upon a landing on the fuselage.

9. The aircraft as claimed in claim 2, wherein at least one of the inner parts comprises:
- at least one cooling device having at least one heat exchanger positioned inside the aerodynamic wing inner part envelope,
- at least one upstream duct connected to the heat exchanger and opening out via at least one forward-facing first opening positioned outside of the aerodynamic wing inner part envelope and below the inner part, and
- at least one downstream duct connected to the heat exchanger and opening out via at least one rearward-facing second opening positioned outside of the aerodynamic wing inner part envelope and above the inner part.

* * * * *